United States Patent Office 2,839,493
Patented June 17, 1958

2,839,493

ALKYL-CYCLOALKYL PHENOLS AND RUBBER COMPOSITIONS INCLUDING SAME AS ANTI-OXIDANTS

Arthur Lambert and Gwyn Eifion Williams, Blackley, Manchester, England, assignors to Imperial Chemical Industries Limited, a corporation of Great Britain No Drawing. Application October 5, 1953
Serial No. 384,335

Claims priority, application Great Britain October 16, 1952

6 Claims. (Cl. 260—45.95)

This invention relates to new chemical compounds and to their manufacture and application as rubber antioxidants.

The said new compounds are 2-α-alkylcycloalkyl-4:6-dimethylphenols in which the alkyl group has not more than 4 carbon atoms and the cycloalkyl group is cyclopentyl, methylcyclopentyl, cyclohexyl or methylcyclohexyl.

We manufacture the compounds by interacting in the presence of an acid catalyst, 2:4-dimethylphenol and an α-alkylcycloalkene in which the alkyl group has, as before, not more than 4 carbon atoms and the cycloalkene is cyclopentene, methylcyclopentene, cyclohexene and methylcyclohexene.

2:4-dimethylphenol is conveniently obtained technically in admixture with the isomeric 2:5-dimethylphenol. It can if desired be combined with the alkylcycloalkene without first separating from the 2:5-isomer.

The new compounds are powerful antioxidants with excellent non-staining properties. As is well known many otherwise excellent antioxidants have the defect of staining white or light-coloured rubber vulcanisates and this defect makes them unsuitable for use in the manufacture of many kinds of rubber articles. Considerable attention has been directed in recent years to the search for new antioxidants which shall be free from this defect and as a result several so-called non-staining antioxidants have been discovered.

However, these antioxidants normally produce some detectable difference in shade; thus a mixture yielding a white vulcanisate without the antioxidant will give a cream one with it.

With the antioxidants of the present invention even this difference is avoided and in general they produce no alteration in the appearance of the vulcanisate.

The new antioxidants may be used in natural and synthetic rubbers and are also adapted for addition to latices of both natural and synthetic rubbers. They are employed in the manufacture of rubber articles according to the usual methods. Thus they may for example be mixed with rubber along with vulcanising or other ingredients and the resulting mixes then cured by heat treatment. They are effective in proportions of about ¼ to 2 percent of the weight of the rubber.

The synthetic rubbers which may be used include for example polymers of butadiene-1:3- and 2-chlorobutadiene-1:3- and copolymers of either of these compounds with acrylonitrile, styrene, methyl methacrylate and other well-known polymerisable compounds which can be used in the manufacture of these rubbers.

The following examples in which parts are by weight illustrate but do not limit the invention.

Example 1

A mixture of 24.4 parts of 2:4-dimethylphenol, 19.6 parts of α-methylcyclohexene and 1.23 parts of sulphuric acid (S. G. 1.84) was stirred for 16 hours at room temperature. The product was dissolved in 200 parts of benzene, washed 3 times with 50 parts of 10% aqueous sodium carbonate and distilled. After removal of the benzene, 2-α-methylcyclohexyl-4:6-dimethylphenol was obtained as a colourless oil B. P. 178–180° C./22 mm. It crystallised from light petroleum (B. P. 40–60° C.) M. P. 28–29° C.

Example 2

Rubber mixes of the following compositions were made up:

|  | A, parts | B, parts |
| --- | --- | --- |
| Pale crepe rubber | 100 | 100 |
| Zinc oxide | 10 | 10 |
| Barytes | 75 | 75 |
| Stearic acid | 1 | 1 |
| Titanium dioxide | 10 | 10 |
| Sulphur | 2 | 2 |
| Zinc diethyldithiocarbamate | 0.375 | 0.375 |
| 2-α-Methylcyclohexyl-4:6-dimethylphenol |  | 1 |

The rubber mixes were vulcanised in a press for 12 minutes at 125° C. and then submitted to accelerated ageing tests in the conventional manner in the oxygen bomb (70° C. and 300 lbs./in.² oxygen pressure) and in the air oven at 100° C.

The results were as follows:

|  | A | | B | |
| --- | --- | --- | --- | --- |
|  | Tensile Strength, kg./sq.cm. | Elongation at break, percent | Tensile Strength, kg./sq.cm. | Elongation at break, percent |
| Unaged | 211 | 726 | 200 | 710 |
| Aged 8 days bomb, 300 p. s. i. O₂ at 70°. | Perished | Perished | 149 | 613 |
| 12 days bomb | do | do | 124 | 633 |
| 16 days bomb | do | do | 99 | 536 |
| Aged 16 hours air oven at 100° C. | 111 | 631 | 134 | 640 |
| Aged 32 hrs. air oven at 100° C. | 84 | 624 | 101 | 608 |
| Aged 48 hrs. air oven at 100° C. | 55 | 593 | 90 | 617 |

Samples of the vulcanised rubber were exposed for 6 weeks to sunlight, with the following results:

A          B
Light cream     Light cream

Example 3

To a stirred mixture of 45 parts of 2:4-dimethylphenol and 2.76 parts of sulphuric acid (S. G. 1.84), α-ethylcyclohexene (18.6 parts) was added dropwise so that the temperature did not exceed 30° C., the mixture was then stirred for 16 hours at room temperature, heated at 60° C., with excess 10% aqueous sodium hydroxide, cooled and extracted with ether. The extract was washed with 10% aqueous sodium hydroxide, water and dried over anhydrous sodium sulphate. After removal of the ether, 2-α-ethylcyclohexyl-4:6-dimethylphenol was obtained as a colourless oil, B. P. 176–178° C./13 mm.

The formula of the compound is as follows:

$$\begin{array}{c} \text{OH} \quad\quad \text{C}_2\text{H}_5 \\ \text{CH}_3-\text{C}-\text{C}=\text{C}-\text{C}-\text{CH}_2-\text{CH}_2 \\ \| \quad\quad | \quad | \\ \text{CH}-\text{C}=\text{CH} \quad \text{CH}_2-\text{CH}_2-\text{CH}_2 \\ | \\ \text{CH}_3 \end{array}$$

Example 4

A mixture of 40 parts of 2:4 dimethylphenol, 1.84 parts of sulphuric acid (S. G. 1.84) and 28 parts of α-n-butylcyclohexene was treated exactly as described in bomb (70° C. and 300 lbs./in.$^2$ oxygen pressure). The results were as follows:

|  | A | | B | | C | | D | | E | |
|---|---|---|---|---|---|---|---|---|---|---|
|  | Tensile Strength, kg./sq. cm. | Elongation at break, percent | Tensile Strength, kg./sq. cm. | Elongation at break, percent | Tensile Strength, kg./sq. cm. | Elongation at break, percent | Tensile Strength, kg./sq. cm. | Elongation at break, percent | Tensile Strength, kg./sq. cm. | Elongation at break, percent |
| Unaged | 179 | 596 | 199 | 637 | 191 | 628 | 198 | 628 | 198 | 546 |
| Aged 8 days bomb, 300 p. s. i. O$_2$ at 70° C. | 17 | 89 | 152 | 530 | 149 | 528 | 155 | 525 | 121 | 477 |
| 12 days bomb | perished | perished | 123 | 628 | 111 | 583 | 103 | 558 | 84 | 516 |
| 16 days bomb | do | do | 92 | 608 | 92 | 577 | 103 | 580 | 79 | 554 |
| Exposure 12 weeks to sunlight. |  |  | No stain same as blank. |  | No stain same as blank. |  | No stain same as blank. |  | No stain same as blank. |  |

Example 3. 2-α-n-butylcyclohexyl-4:6 dimethylphenol was obtained as a colourless oil, B. P. 100° C./0.03 mm. It crystallised from light petroleum (B. P. 60–80° C.), M. P. 57–58° C.

*Example 5*

A mixture of 50 parts of 2:4 dimethylphenol, 2.76 parts of sulphuric acid (S. G. 1.84) and 30.5 parts of α-γ-dimethylcyclohexene was treated exactly as described in Example 3. 2-α-γ-dimethylcyclohexyl-4:6-dimethylphenol was obtained as a colourless oil, B. P. 188–190° C./18 mm. It crystallised from light petroleum (B. P. 60–80° C.), M. P. 71–73° C.

*Example 6*

A mixture of 50 parts of 2:4-dimethylphenol, 1.84 parts of sulphuric acid (S. G. 1.84) and 20.5 parts of α-methylcyclopentene was treated exactly as in Example 3. 2-α-methylcyclopentyl-4:6-dimethylphenol was obtained as a colourless oil, B. P. 160–164° C./16 mm. It crystallised from light petroleum (B. P. 60–80° C.), M. P. 46–47° C.

*Example 7*

Rubber mixes of the following compositions were made up:

|  | A | B | C | D | E |
|---|---|---|---|---|---|
| Pale crepe rubber | 100 | 100 | 100 | 100 | 100 |
| Zinc oxide | 10 | 10 | 10 | 10 | 10 |
| Barytes | 75 | 75 | 75 | 75 | 75 |
| Stearic acid | 1 | 1 | 1 | 1 | 1 |
| Titanium dioxide | 10 | 10 | 10 | 10 | 10 |
| Sulphur | 2.5 | 2.5 | 2.5 | 2.5 | 2.5 |
| Tetramethylthiuram monosulphide | 0.5 | 0.5 | 0.5 | 0.5 | 0.5 |
| 2-α-ethylcyclohexyl-4:6-dimethylphenol |  | 1 |  |  |  |
| 2-α-n-butylcyclohexyl-4:6-dimethylphenol |  |  | 1 |  |  |
| 2-α-γ-dimethylcyclohexyl-4:6-dimethylphenol |  |  |  | 1 |  |
| 2-α-methylcyclopentyl-4:6-dimethylphenol |  |  |  |  | 1 |

The rubber mixes were vulcanised in a press for 10 minutes at 141° C., and then submitted to accelerated ageing tests in the conventional manner in the oxygen

What we claim is:

1. 2-alpha-alkylcycloalkyl-4:6-dimethylphenols in which the alkyl substituent has not more than 4 carbon atoms and the cycloalkyl substituent is selected from the group consisting of cyclopentyl, methylcyclopentyl, cyclohexyl and methylcyclohexyl.

2. 2-alpha-methylcyclohexyl-4:6-dimethylphenol.

3. Process for the manufacture of 2-alpha-alkylcycloalkyl-4:6-dimethylphenols in which the alkyl group has not more than 4 carbon atoms and the cycloalkyl substituent is selected from the group consisting of cyclopentyl, methylcyclopentyl, cyclohexyl and methylcyclohexyl, which comprises interacting at from substantially room temperature up to about 30° C., in the presence of an acid catalyst, 2:4-dimethylphenol and an alpha-alkylcycloalkene in which the alkyl group has not more than 4 carbon atoms and the cycloalkene is selected from the group consisting of cyclopentene, methylcyclopentene, cyclohexene and methylcyclohexene.

4. A rubber composition comprising a rubber selected from the group consisting of natural rubber, synthetic rubbers selected from the group consisting of polymers of butadiene-1,3 and 2-chlorobutadiene-1,3 and copolymers thereof with acrylonitrile, styrene and methyl methacrylate, and having one of the 2-alpha-alkylcycloalkyl-4:6-dimethylphenols of claim 1 incorporated therein, said composition being characterized by its age-resistance.

5. A rubber composition as claimed in claim 4 comprising from ¼ to 2%, by weight of the rubber therein, of the 2-alpha-alkylcycloalkyl-4:6-dimethylphenol.

6. A rubber composition, as claimed in claim 4, wherein said rubber is in the form of latices.

References Cited in the file of this patent

UNITED STATES PATENTS

| 1,917,823 | Britton et al. | July 11, 1933 |
| 2,248,827 | Stevens et al. | July 8, 1941 |
| 2,567,848 | Kooyman | Sept. 11, 1951 |

OTHER REFERENCES

Wegler et al.: "Makromol," Chem. 9, 1–24 (1952), abstracted in Chemical Abstracts, vol. 48, pp. 640–641 (1954).